United States Patent

Satoh et al.

[11] Patent Number: 5,499,440
[45] Date of Patent: Mar. 19, 1996

[54] STAKING METHOD

[75] Inventors: Masatoshi Satoh; Tetsuya Ohnuma, both of Yamagata, Japan

[73] Assignee: Pioneer Electric Corporation, Tokyo, Japan

[21] Appl. No.: 276,482

[22] Filed: Jul. 5, 1994

Related U.S. Application Data

[63] Continuation of Ser. No. 88,536, Jul. 9, 1993, abandoned.

[30] Foreign Application Priority Data

Aug. 21, 1992 [JP] Japan ................................. 4-245540

[51] Int. Cl.⁶ ................................................ B21D 31/06
[52] U.S. Cl. ............................ 29/512; 29/513; 29/522.1
[58] Field of Search .......................... 29/169.5, 509–513, 29/521, 522.1, 243.53; 72/76, 372; 381/199, 204, 88; 403/278, 280

[56] References Cited

U.S. PATENT DOCUMENTS

| | | | |
|---|---|---|---|
| 2,949,663 | 8/1960 | Perry | 29/169.5 X |
| 3,221,533 | 12/1965 | Buys | 29/512 X |
| 3,754,731 | 8/1973 | Mackal et al. | 29/512 X |
| 3,923,089 | 12/1975 | Ladouceur | 29/512 X |
| 4,212,099 | 7/1980 | Williams et al. | 29/512 X |
| 4,281,446 | 8/1981 | Umeno | 29/513 X |
| 4,615,098 | 10/1986 | Côme et al. | 29/512 X |
| 5,295,195 | 3/1994 | Mitobe et al. | 381/199 |

FOREIGN PATENT DOCUMENTS

| | | | |
|---|---|---|---|
| 2807285 | 2/1978 | Germany . | |
| 300655 | 9/1932 | Italy | 29/169.5 |
| 856845 | 12/1960 | United Kingdom | 29/512 |
| 2173139 | 10/1986 | United Kingdom | 29/243.53 |

*Primary Examiner*—Peter Vo
*Attorney, Agent, or Firm*—Nikaido, Marmelstein, Murray & Oram

[57] ABSTRACT

A perforated hole having a tapered wall is formed in a frame of a loudspeaker. The hole has a plurality of radial ribs on the tapered wall. A projection is provided on a metalic plate. The projection is engaged with the perforated hole and the top of the projection is peened so as to deform the projection, thereby to fasten the frame to the metalic plate.

3 Claims, 3 Drawing Sheets

FIG.6a
PRIOR ART
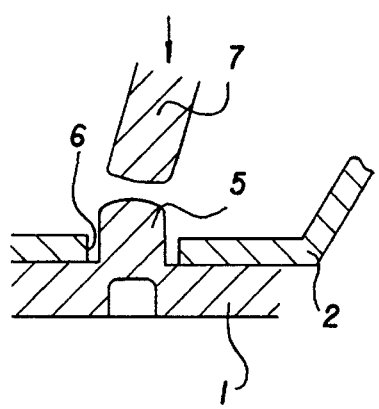
FIG.6b
PRIOR ART
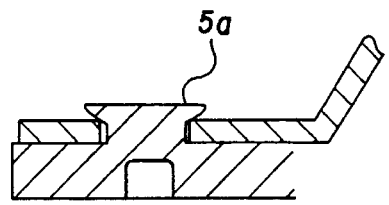
FIG.7
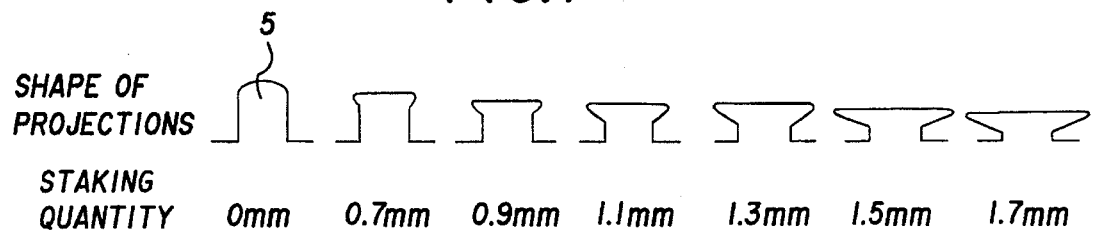
| SHAPE OF PROJECTIONS | | | | | | | |
|---|---|---|---|---|---|---|---|
| STAKING QUANTITY | 0mm | 0.7mm | 0.9mm | 1.1mm | 1.3mm | 1.5mm | 1.7mm |
FIG.8a
PRIOR ART
FIG.8b
PRIOR ART
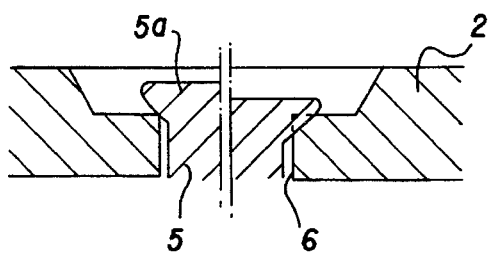

STAKING METHOD

This application is a continuation of application Ser. No. 08/088,536 filed Jul. 9, 1993 now abandoned.

FIELD OF THE INVENTION

The present invention relates to a staking method, and more particularly to a method for fastening a plastic member such as a frame of a loudspeaker to a plate.

BACKGROUND OF THE INVENTION

Referring to FIG. 5, in a generally employed conventional method, a screw 3 is used for fastening a speaker frame 2 made of plastic to a metalic plate 1. The plastic frame 2 has a hole which coincides with a threaded hole 4 formed in the plate 1 when the frame is mounted on the plate. The screw 3 is engaged with the threaded hole, thereby fastening the frame 2 on the plate 1.

However, in such a fastening method, the use of the screw increases the number of parts. Moreover, additional procedures of machining the thread in the plate and fastening the screw are necessary. Hence the manufacturing cost increases.

There has been proposed staking as an alternative fastening method. Referring to FIG. 6a, the plate has a projection 5 which projects out of a hole 6 formed in the frame 2. The top of the projection 5 is pressed by a staking punch 7 attached on a rotary head provided on a press machine to fasten the frame 2 to the plate 1. As a result, the projection 5 is deformed to form a head 5a as shown in FIG. 6b.

As shown in FIG. 7, the shape of the head 5a of the projection 5 is largely changed in spite of small variation of the staking quantity. If the staking quantity is constant, the plate and the frame are uniformly fastened. Actually, however, the height of the projection 5 and the pressure applied by the punch 7 may vary because of various errors such as manufacturing error so that the staking quantity inevitably differs.

More particularly if the staking quantity is small, the head 5a of the projection 5 only rests on the frame 2 as shown in FIG. 8a so that fastening strength is not sufficient.

On the other hand, when the staking quantity is excessively large, the head 5a presses the frame along the inner upper periphery of the hole 6 with a large force as shown in FIG. 8b. In such a case, cracks may be formed in the frame 2, or the frame may be broken. Therefore, the allowable range of the staking quantity is small.

SUMMARY OF THE INVENTION

An object of the present invention is to provide a staking method wherein a plastic member may be properly and sufficiently fastened to a metal plate under any staking conditions without causing cracks to be formed in the members.

According to the present invention, there is provided a method for staking two members, one of which having a projection, and the other having a countersunk hole in which the projection is inserted. The countersunk hole has a tapered wall on which a plurality of radial ribs are formed.

Thus in accordance with the present invention, when the projection is peened for staking, a head portion of the projection is deformed to firmly engage the members with each other. Hence, the two members can be properly fastened together despite the difference in staking quantity.

The other objects and features of this invention will become understood from the following description with reference to the accompanying drawings.

BRIEF DESCRIPTION OF DRAWINGS

FIGS. 6a and 6b are diagrams explaining a conventional staking method;

FIG. 7 is a schematic diagram showing various deformed projection heads in accordance with staking quantities; and FIGS. 8a and 8b are sectional views showing a frame and a plate fastened together in accordance with the conventional staking method.

DETAILED DESCRIPTION OF THE PREFERRED EMBODIMENT

The present invention is described hereinafter with reference to FIGS. 1 to 4. The same numerals as those in FIGS. 5 to 8 designate the same parts in the FIGS. 1 to 4.

Figure 1:
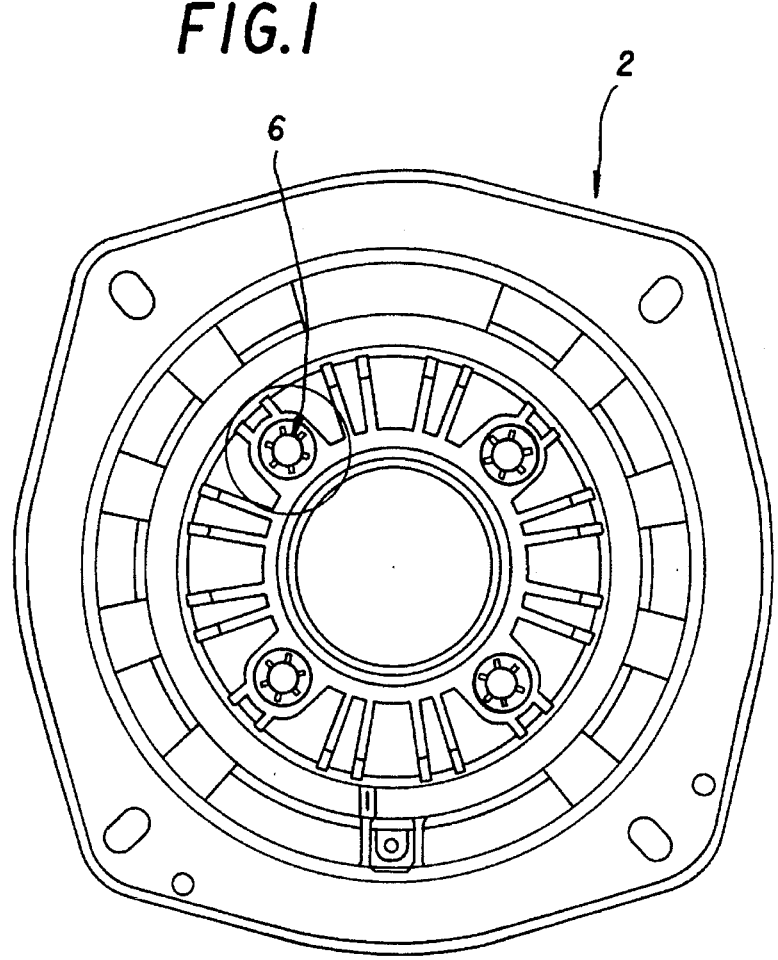
FIG. 1 is a plan view of a plastic frame of a loudspeaker to which the present invention is applied.
Figures 4A, 4B:
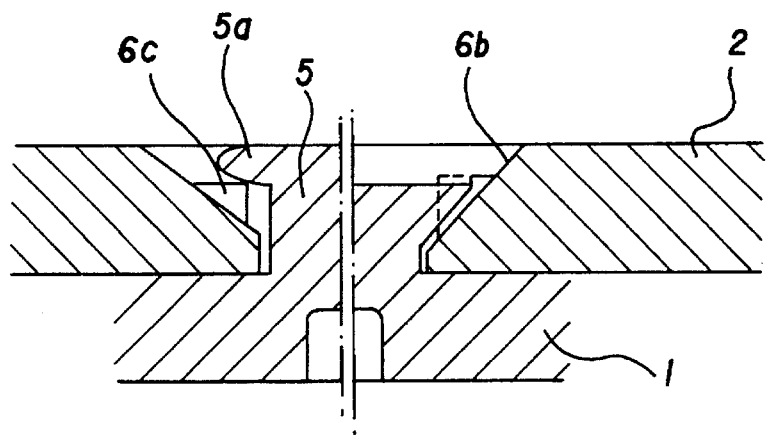
FIGS. 4a and 4b are sectional views showing the frame of FIG. 1 and a metalic plate fastened together in accordance with the present invention.
Figure 5:
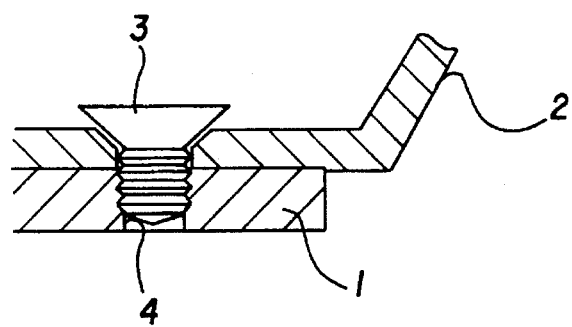
FIG. 5 is a diagram explaining a conventional method for attaching a frame to a plate.

The present invention is applied to a loudspeaker having the speaker frame 2 shown in FIG. 1, which is to be fastened to the plate 1 (FIGS. 4a and 4b). The frame 2 has four holes 6 equidistantly formed on a periphery of a central portion thereof.

Figure 2:
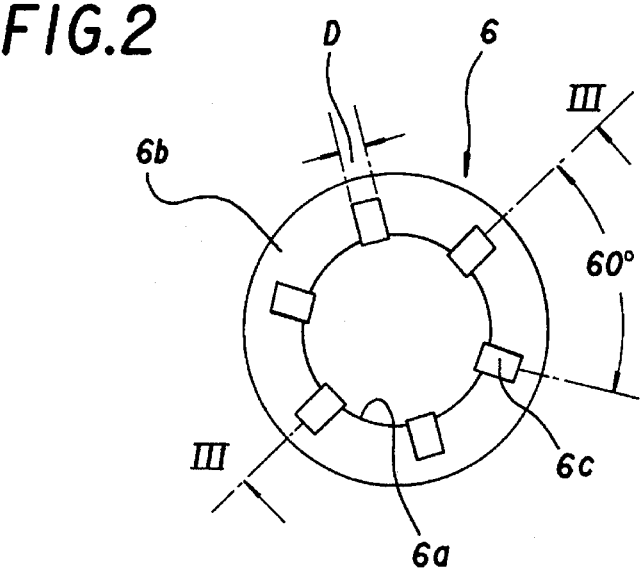
FIG. 2 is a plan view of a part of the frame of FIG. 1 showing one of the holes formed therein.
Figure 3:
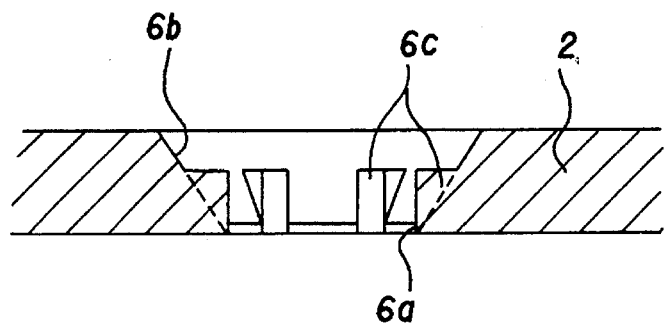
FIG. 3 is a sectional view taken along a line III—III of FIG. 2.

As shown in FIGS. 2 and 3, each hole 6 is a perforated countersunk hole having a vertical round hole 6a and a tapered wall 6b above the vertical round hole 6a. A plurality of ribs 6c are radially and equidistantly provided on the countersink 6b. In the present embodiment, although six ribs 6c in 60 degrees angular disposition are provided, any number will do as long as the number and the width D thereof are sufficient to support a magnetic circuit of the loudspeaker. Furthermore, the width D of the ribs 6c is so adapted as not to break the plastic material surrounding the hole when staking.

In order to fasten the frame 2 to the plate 1, the projections 5 of the plate 1 are inserted in the holes 6 and the top end of each projection 5 is peened with a staking punch provided on a rotary head of a press machine, in the same manner as in the conventional staking method. Even if the staking quantity is small, the projection 5 is deformed to form the head 5a which abuts on the edges of the ribs 6c as shown in FIG. 4a. As a result, the frame and the plate are fastened with sufficient strength. When the staking quantity is large, the head 5a is deformed so that a part of the head enters spaces between the ribs 6c as shown in FIG. 4b. Thus the frame 2 is protected from excessive pressure. Accordingly, a permissible range of the staking quantity is enlarged.

More particularly, in the conventional method shown in FIGS. 8a and 8b, if the staking quantity is less than 1.1 mm, a gap is formed between the projection 5 and the frame 2, causing the frame to rattle. When the quantity exceeds 1.5 mm, a part of the head 5a is forced into the frame 2 surrounding the hole 6, resulting in the cracking thereof. However, in the present invention, a part of the head may enter the space between the ribs. Thus, the permissible range of the staking quantity is enlarged, namely from 0.7 mm to 1.7 mm.

From the foregoing it will be understood that the present invention provides a method for appropriately fastening a plastic frame to a metalic plate by staking under any staking conditions. Thus the plastic frame is prevented from cracking although an excessive pressure may be applied to a projection of the plate. Moreover, since the screws are not used, the cost for assemblage need not be increased.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A method of staking two members comprising the steps of:

providing two members, one of said members having first and second surfaces defining a predetermined thickness therebetween;

forming a perforated hole through the thickness of said one member, said perforated hole comprising a cylindrical portion extending from said first surface to a junction point located within said predetermined thickness and a tapered wall above said cylindrical portion extending from said junction point to said second surface;

forming a plurality of upwardly projecting radial ribs on the tapered wall, each of said radial ribs having an edge projecting in an upwardly slant direction with respect to said first surface into said perforated hole;

forming a projection on the other member;

engaging the projection through the perforated hole;

peening a top of the projection as to plastically deform the projection wherein a peripheral portion of the projection encroaches indentations between the radial ribs.

2. The method according to claim 1 wherein the member having the perforated hole is made of plastic.

3. The method according to claim 1 wherein the member having the perforated hole is a frame for a loudspeaker.

* * * * *

UNITED STATES PATENT AND TRADEMARK OFFICE
CERTIFICATE OF CORRECTION

PATENT NO. : 5,499,440
DATED : March 19, 1996
INVENTOR(S) : Masatoshi Satoh, et al.

It is certified that error appears in the above-indentified patent and that said Letters Patent is hereby corrected as shown below:

Title page, item [73] Assignee: should read -- Pioneer Eletronic Corporation--

Signed and Sealed this

Seventeenth Day of June, 1997

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,499,440
DATED : March 19, 1996
INVENTOR(S) : SATOH et al.

It is certified that error appears in the above-indentified patent and that said Letters Patent is hereby corrected as shown below:

On the title page;

Item [73], line 1, please delete "Pioneer Electric Corporation" insert therefor

-- Pioneer Electronic Corporation -- ; and please add second Assignee's information to read as -- Tohoku Pioneer Electronic Corporation, Tendo-shi, Japan --.

This certificate supersedes Certificate of Correction issued June 17, 1997.

Signed and Sealed this

Thirtieth Day of June, 1998

Attest:

BRUCE LEHMAN

*Attesting Officer*  *Commissioner of Patents and Trademarks*